(12) United States Patent
Xu

(10) Patent No.: US 10,708,033 B2
(45) Date of Patent: Jul. 7, 2020

(54) NETWORK TIME CORRECTION METHOD AND APPARATUS

(71) Applicant: Hangzhou Hikvision Digital Technology Co., Ltd., Hangzhou, Zhejiang (CN)

(72) Inventor: Sen Xu, Zhejiang (CN)

(73) Assignee: Hangzhou Hikvision Digital Technology Co., Ltd., Hangzhou, Zhejiang (CN)

( * ) Notice: Subject to any disclaimer, the term of this patent is extended or adjusted under 35 U.S.C. 154(b) by 0 days.

(21) Appl. No.: 16/494,906

(22) PCT Filed: Mar. 12, 2018

(86) PCT No.: PCT/CN2018/078699
§ 371 (c)(1),
(2) Date: Sep. 17, 2019

(87) PCT Pub. No.: WO2018/166418
PCT Pub. Date: Sep. 20, 2018

(65) Prior Publication Data
US 2020/0036505 A1   Jan. 30, 2020

(30) Foreign Application Priority Data
Mar. 17, 2017   (CN) .......................... 2017 1 0161466

(51) Int. Cl.
*H04L 7/00*   (2006.01)
*G04F 5/14*   (2006.01)
(Continued)

(52) U.S. Cl.
CPC .............. *H04L 7/0016* (2013.01); *G04F 5/14* (2013.01); *H04J 3/0638* (2013.01); *H04J 3/0667* (2013.01); *H04L 29/08* (2013.01)

(58) Field of Classification Search
CPC ...... H04L 7/0016; H04L 29/08; H04J 3/0667; H04J 3/0638; G04F 5/14
See application file for complete search history.

(56) References Cited

U.S. PATENT DOCUMENTS

2010/0098111 A1   4/2010   Sun et al.
2014/0314073 A1   10/2014   Sugimoto
(Continued)

FOREIGN PATENT DOCUMENTS

CA   2300255 A1   2/2001
CN   101022639 A   8/2007
(Continued)

OTHER PUBLICATIONS

Wen et al., Improved Multi-hop Time Synchronization for Underwater Acoustic Networks, International Conference on Wireless Communications and Signal Processing, IEEE, Oct. 24, 2013, p. 1-6.
(Continued)

*Primary Examiner* — Vineeta S Panwalkar
(74) *Attorney, Agent, or Firm* — Bret E. Field; Bozicevic, Field & Francis LLP

(57) ABSTRACT

The application provides a network time correction method and apparatus. The network time correction method includes: obtaining historical time correction data before a current moment when a self-adaptive time-correction instruction is received; calculating a total historical time-correction difference value corresponding to each of the historical time-correction time points; obtaining a total current time-correction difference value for the current moment by a preset algorithm, according to the total historical time-correction difference value corresponding to each of the historical time-correction time points; determining a difference value between the total current time-correction difference value for the current moment and a total historical
(Continued)

time-correction difference value for a total historical time-correction time point closest to the current moment, as a time-correction difference value for the current moment; and adjusting time at the current moment according to the time-correction difference value for the current moment to complete a self-adaptive time correction. Through this solution, the amount of redundant data in the network can be reduced while the accuracy of the device time is ensured.

18 Claims, 4 Drawing Sheets

(51) Int. Cl.
*H04J 3/06* (2006.01)
*H04L 29/08* (2006.01)

(56) References Cited

U.S. PATENT DOCUMENTS

| | | | | |
|---|---|---|---|---|
| 2015/0003478 | A1* | 1/2015 | Kristoffersen | H04L 43/0858 370/503 |
| 2015/0346760 | A1* | 12/2015 | Kishiro | H04J 3/0661 713/503 |
| 2016/0380749 | A1* | 12/2016 | Jose | H04L 69/40 709/248 |
| 2018/0203516 | A1* | 7/2018 | Takamura | G06K 9/00355 |

FOREIGN PATENT DOCUMENTS

| | | |
|---|---|---|
| CN | 102104475 A | 6/2011 |
| CN | 102231907 A | 11/2011 |
| CN | 106154814 A | 11/2016 |
| WO | WO2005002100 A1 | 1/2005 |

OTHER PUBLICATIONS

Chirdchoo et al., MU-Sync: A Time Synchronization Protocol for Underwater Mobile Networks, Underwater Networks, ACM, Sep. 15, 2008, p. 35-42.

* cited by examiner

NETWORK TIME CORRECTION METHOD AND APPARATUS

The present application claims the priority to a Chinese Patent Application No. 201710161466.3, entitled "NETWORK TIME CORRECTION METHOD AND APPARATUS", filed with the China National Intellectual Property Administration on Mar. 17, 2017, which is incorporated herein by reference in its entirety.

TECHNICAL FIELD

The application relates to the field of network time correction technology, in particular to a network time correction method and apparatus.

BACKGROUND

With the development of computer network technology and video technology, the time synchronization of network devices plays an increasingly important role in the network.

In general, in a network device, such as a computer or a network camera, the device time is obtained by a hardware crystal oscillator chip in the device through calculation. However, due to factors such as manufacturing process, device cost, hardware design and so on, there is a certain error in the operation of the hardware crystal oscillator chip in the device, and this error has an important impact on the operation of the device. For example, for a linkage system of a multi-network camera, multiple network cameras monitor different locations in the same area. If the videos of all network cameras at the same moment need to be synchronously invoked, a large error in shooting time of these network cameras will result in the error analysis to the videos. For example, if the error in shooting time of two cameras is more than 5 seconds, there will be a delay of more than 5 seconds between two obtained videos, and the contents of the two videos are not video information at the same moment, which will result in error understanding and analysis. If the shooting time of these network cameras is well synchronous, the process of an event in video can be easily analyzed. Therefore, when the device operates for a period of time, it is necessary to correct the time of the device to ensure the accuracy and synchronization of the current time of the device.

In the existing time correction methods, the user usually needs to configure the address and time correction period of the time correction server. In the process of time correction, the user needs to send a time correction request periodically to the time correction server in the network. According to a time protocol, the device time is reconfigured by interacting with the time correction information of the time correction server.

The traditional time protocol is NTP (Network Time Protocol), which is mainly used to measure a round-trip transmission delay of a time correction request packet in the network and estimate a clock deviation of a device, and to correct the time of the device according to the estimated clock deviation. As shown in FIG. 1, a to-be-time-corrected network device 101 sends a time correction request; a time correction server 102 sends time correction data to the to-be-time-corrected network device 101 after receiving the time correction request; and the to-be-time-corrected network device 101 completes time correction after receiving the time correction data, and then sends a time correction completion status to the time correction server 102, to achieve the high-precision time correction of the device over the network.

In the existing technologies described above, in order to ensure the accuracy of the device time, a relatively short time correction interval is usually set for the time correction period. For example, the time correction interval is set to 30 seconds, and thus one time correction is performed every 30 seconds. This not only ensures the accuracy of the device time, but also ensures the synchronization among the devices. However, due to the relatively short time correction interval, many short-time time-correction data packets will be generated in the network, resulting in an increase in the amount of redundant data in the network.

SUMMARY

The object of this application is to provide a network time correction method and apparatus, which can reduce the amount of redundant data in the network while ensuring the accuracy of the device time. The specific technical solutions are as follows.

In the first aspect, there is provided a network time correction method according to an embodiment of the application, including:

obtaining historical time correction data before a current moment when a self-adaptive time-correction instruction is received, wherein the historical time correction data comprises: each of historical time-correction time points, and a time-correction difference value corresponding to each of the historical time-correction time points;

calculating a total historical time-correction difference value corresponding to each of the historical time-correction time points;

obtaining a total current time-correction difference value for the current moment by a preset algorithm, according to the total historical time-correction difference value corresponding to each of the historical time-correction time points;

determining a difference value between the total current time-correction difference value for the current moment and a total historical time-correction difference value for a historical time-correction time point closest to the current moment, as a time-correction difference value for the current moment; and adjusting time at the current moment according to the time-correction difference value for the current moment to complete a self-adaptive time correction.

Optionally, the self-adaptive time-correction instruction is generated based on a user input, or is generated periodically according to a preset self-adaptive time-correction period.

Optionally, the method further includes:

before receiving the first self-adaptive time-correction instruction, performing server network time corrections by a time correction server according to a preset first network time-correction period, and storing a time-correction time point of each of the server network time corrections and a time-correction difference value corresponding to the time-correction time point of this server network time correction, as historical time correction data;

after receiving the first self-adaptive time-correction instruction, prolonging the preset first network time-correction period to a preset duration, and performing a server network time correction by the time correction server according to the preset duration to obtain a first time-correction time point corresponding to this server network time correction and a time-correction difference value corresponding to the first time-correction time point;

if the number of pieces of the historical time correction data is less than a preset number, storing the first time-correction time point and the time-correction difference value corresponding to the first time-correction time point as historical time correction data; and if the number of pieces of the historical time correction data is equal to the preset number, deleting the earliest historical time-correction time point in the historical time correction data and a time-correction difference value corresponding to the earliest historical time-correction time point, and storing the first time-correction time point and the time-correction difference value corresponding to the first time-correction time point as historical time correction data.

Optionally, performing server network time corrections by a time correction server according to a preset first network time-correction period, and storing a time-correction time point of each of the server network time corrections and a time-correction difference value corresponding to the time-correction time point of this server network time correction, as historical time correction data, includes:

obtaining a plurality of sets of time correction information, wherein the time correction information comprises: first time T1 when a to-be-time-corrected network device sends a time correction request to the time correction server, second time T2 when the time correction server receives the time correction request, third time T3 when the time correction server sends time correction data to the to-be-time-corrected network device, and fourth time T4 when the to-be-time-corrected network device receives the time correction data, and the time correction data includes: time-correction server time obtained by the time correction server after analyzing the time correction request;

obtaining a time-correction time point of a server network time correction corresponding to the second time T2 or the third time T3 in each of the sets of time correction information;

determining a time-correction difference value corresponding to a time-correction time point of each of the server network time corrections, according to each of the sets of time correction information; and storing the time-correction time point of each of the server network time corrections and the time-correction difference value corresponding to the time-correction time point of this server network time correction as historical time correction data.

Optionally, determining a time-correction difference value corresponding to a time-correction time point of each of the server network time corrections, according to each of the sets of time correction information, includes:

calculating a first difference value between the second time T2 and the first time T1 in each of the sets of time correction information, and a second difference value between the fourth time T4 and the third time T3 in each of the sets of time correction information; and dividing a difference between the first difference value and the second difference value by 2, to obtain the time-correction difference value corresponding to the time-correction time point of each of the server network time corrections.

Optionally, calculating a total historical time-correction difference value corresponding to each of the historical time-correction time points, includes:

obtaining a self-adaptive time-correction flag and determining whether a self-adaptive time correction has been performed according to the self-adaptive time-correction flag;

if the self-adaptive time correction has not been performed, calculating the sum of the time-correction difference value for each of the historical time-correction time points and the time-correction difference values for all historical time-correction time points before this historical time-correction time point, to obtain the total historical time-correction difference value corresponding to this historical time-correction time point; and if the self-adaptive time correction has been performed, adding the sum of the time-correction difference value for each of the historical time-correction time points and the time-correction difference values for all historical time-correction time points before this historical time-correction time point with a time-correction difference value for the self-adaptive time correction that has been performed, to obtain the total historical time-correction difference value corresponding to this historical time-correction time point.

Optionally, obtaining a total current time-correction difference value for the current moment by a preset algorithm, according to the total historical time-correction difference value corresponding to each of the historical time-correction time points, includes:

determining an average time-correction time point of all the historical time-correction time points;

determining an average total time-correction difference value for all the historical time-correction time points, according to the total historical time-correction difference value corresponding to each of the historical time-correction time points;

obtaining a first parameter by a first calculation formula, according to each of the historical time-correction time points, the total historical time-correction difference value corresponding to each of the historical time-correction time points, the average time-correction time point and the average total time-correction difference value, wherein the first calculation formula is:

$$b = \frac{\sum_{i=1}^{n}(x_i y_i - n\bar{x}\bar{y})}{\sum_{i=1}^{n} x_i^2 - n\bar{x}^2},$$

where, b is the first parameter, $x_i$ is the i-th historical time-correction time point, $y_i$ is a time-correction difference value for the i-th historical time-correction time point, n is the total number of the historical time-correction time points, $\bar{x}$ is the average time-correction time point, $\bar{y}$ is the average total time-correction difference value;

obtaining a second parameter by a second calculation formula, according to the average time-correction time point, the average total time-correction difference value and the first parameter, wherein the 10 second calculation formula is:

$$a = \bar{y} - b\bar{x},$$

where, a is the second parameter, $\bar{y}$ is the average total time-correction difference value, b is the first parameter, $\bar{x}$ is the average time-correction time point;

obtaining a total current time-correction difference value y for the current moment by substituting the first parameter and the second parameter into the following linear fitting equation:

$$y=bx+a,$$

where, y is the total current time-correction difference value for the current moment, b is the first parameter, x is the time-correction time point of the current moment, and a is the second parameter.

Optionally, adjusting time at the current moment according to the time-correction difference value for the current moment to complete a self-adaptive time correction, includes:

adding the current moment to the time-correction difference value for the current moment to obtain a target time-correction time for the current moment; and adjusting the time at the current moment to the target time-correction time to complete the self-adaptive time correction.

In the second aspect, there is provided a network time correction apparatus according to an embodiment of the application, including:

an obtaining module, configured for obtaining historical time correction data before a current moment when a self-adaptive time-correction instruction is received, wherein the historical time correction data comprises: each of historical time-correction time points, and a time-correction difference value corresponding to each of the historical time-correction time points;

a calculating module, configured for calculating a total historical time-correction difference value corresponding to each of the historical time-correction time points;

a first determining module, configured for obtaining a total current time-correction difference value for the current moment by a preset algorithm, according to the total historical time-correction difference value corresponding to each of the historical time-correction time points;

a second determining module, configured for determining a difference value between the total current time-correction difference value for the current moment and a total historical time-correction difference value for a historical time-correction time point closest to the current moment, as a time-correction difference value for the current moment; and an adjusting module, configured for adjusting time at the current moment according to the time-correction difference value for the current moment to complete a self-adaptive time correction.

Optionally, the self-adaptive time-correction instruction is generated based on a user input, or is generated periodically according to a preset self-adaptive time-correction period.

Optionally, the apparatus further includes:

a first storing module, configured for, before the first self-adaptive time-correction instruction is received, performing server network time corrections by a time correction server according to a preset first network time-correction period, and storing a time-correction time point of each of the server network time corrections and a time-correction difference value corresponding to the time-correction time point of this server network time correction, as historical time correction data;

a third determining module, configured for, after the first self-adaptive time-correction instruction is received, prolonging the preset first network time-correction period to a preset duration, and performing a server network time correction by the time correction server according to the preset duration to obtain a first time-correction time point corresponding to this server network time correction and a time-correction difference value corresponding to the first time-correction time point;

a second storing module, configured for, if the number of pieces of the historical time correction data is less than a preset number, storing the first time-correction time point and the time-correction difference value corresponding to the first time-correction time point as historical time correction data; and a third storing module, configured for, if the number of pieces of the historical time correction data is equal to the preset number, deleting the earliest historical time-correction time point in the historical time correction data and a time-correction difference value corresponding to the earliest historical time-correction time point, and storing the first time-correction time point and the time-correction difference value corresponding to the first time-correction time point as historical time correction data.

Optionally, the first storage module includes:

a first obtaining sub-module, configured for obtaining a plurality of sets of time correction information, wherein the time correction information comprises: first time T1 when a to-be-time-corrected network device sends a time correction request to the time correction server, second time T2 when the time correction server receives the time correction request, third time T3 when the time correction server sends time correction data to the to-be-time-corrected network device, and fourth time T4 when the to-be-time-corrected network device receives the time correction data, and the time correction data comprises: time-correction server time obtained by the time correction server after analyzing the time correction request;

a second obtaining sub-module, configured for obtaining a time-correction time point of a server network time correction corresponding to the second time T2 or the third time T3 in each of the sets of time correction information;

a first determining sub-module, configured for determining a time-correction difference value corresponding to a time-correction time point of each of the server network time corrections, according to each of the sets of time correction information; and a storing sub-module, configured for storing the time-correction time point of each of the server network time corrections and the time-correction difference value corresponding to the time-correction time point of this server network time correction as historical time correction data.

Optionally, the first determining sub-module includes:

a calculating unit, configured for calculating a first difference value between the second time T2 and the first time T1 in each of the sets of time correction information, and a second difference value between the fourth time T4 and the third time T3 in each of the sets of time correction information;

a determining unit, configured for dividing a difference between the first difference value and the second difference value by 2, to obtain the time-correction difference value corresponding to the time-correction time point of each of the server network time corrections.

Optionally, the calculating module includes:

a judging sub-module, configured for obtaining a self-adaptive time-correction flag and determining whether a self-adaptive time correction has been performed according to the self-adaptive time-correction flag;

a second determining sub-module, configured for, if the self-adaptive time correction has not been performed, calculating the sum of the time-correction difference value for each of the historical time-correction time points and the time-correction difference values for all historical time-correction time points before this historical time-correction time point, to obtain the total historical time-correction difference value corresponding to this historical time-correction time point; and a third determining sub-module, configured for, if the self-adaptive time correction has been performed, adding the sum of the time-correction difference value for each of the historical time-correction time points and the time-correction difference values for all historical time-correction time points before this historical time-correction time point with a time-correction difference value for the self-adaptive time correction that has been performed, to obtain the total historical time-correction difference value corresponding to this historical time-correction time point.

Optionally, the first determining module includes:

an average time-correction time point determining sub-module, configured for determining an average time-correction time point of all the historical time-correction time points;

an average total time-correction difference value determining sub-module, configured for determining an average total time-correction difference value for all the historical time-correction time points, according to the total historical time-correction difference value corresponding to each of the historical time-correction time points;

a first parameter determining sub-module, configured for obtaining a first parameter by a first calculation formula, according to each of the historical time-correction time points, the total historical time-correction difference value corresponding to each of the historical time-correction time points, the average time-correction time point and the average total time-correction difference value, wherein the first calculation formula is:

$$b = \frac{\sum_{i=1}^{n}(x_i y_i - n\bar{x}\bar{y})}{\sum_{i=1}^{n} x_i^2 - n\bar{x}^2},$$

where, b is the first parameter, $x_i$ is the i-th historical time-correction time point, $y_i$ is a time-correction difference value for the i-th historical time-correction time point, n is the total number of the historical time-correction time points, $\bar{x}$ is the average time-correction time point, $\bar{y}$ is the average total time-correction difference value;

a second parameter determining sub-module, configured for obtaining a second parameter by a second calculation formula, according to the average time-correction time point, the average total time-correction difference value and the first parameter, wherein the 10 second calculation formula is:

$$a = \bar{y} - b\bar{x},$$

where, a is the second parameter, $\bar{y}$ is the average total time-correction difference value, b is the first parameter, $\bar{x}$ is the average time-correction time point;

a total current time-correction difference value determining sub-module, configured for obtaining a total current time-correction difference value y for the current moment by substituting the first parameter and the second parameter into the following linear fitting equation:

$$y = bx + a$$

where, y is the total current time-correction difference value for the current moment, b is the first parameter, x is the time-correction time point of the current moment, and a is the second parameter.

Optionally, the adjusting module includes:

a target time-correction time determining sub-module, configured for adding the current moment to the time-correction difference value for the current moment to obtain a target time-correction time for the current moment; and an adjusting sub-module, configured for adjusting the time at the current moment to the target time-correction time to complete the self-adaptive time correction.

In a third aspect, there is provided a storage medium for storing executable code which, when executed, performs the network time correction method according to the first aspect of the application.

In a fourth aspect, there is provided an application program which, when executed, performs the network time correction method according to the first aspect of the application.

In a fifth aspect, there is provided a network device, including a processor, a memory, a communication interface, and a bus, wherein the processor, the memory and the communication interface are connected and communicate with each other via the bus;

the memory stores executable program code;

the processor executes a program corresponding to the executable application code by reading the executable application code stored in the memory, to perform the network time correction method according to the first aspect of the application.

In a network time correction method and apparatus according to the embodiments of the application, the total time-correction difference value for each historical time-correction time point is obtained by accumulating the historical time correction data, and summing the time-correction difference values in the historical time correction data; the time-correction difference value for the current moment is obtained by preset algorithm; and the time at the current moment is adjusted according to the time-correction difference value for the current moment. The method and apparatus has higher real-time performance and ensures the accuracy of the device time. Moreover, the method and apparatus can reduce the amount of redundant data in the network, since only a small amount of historical data is required to accumulate, that is, less time correction data packets are transmitted between the time correction device and the server.

BRIEF DESCRIPTION OF THE DRAWINGS

In order to more clearly describe the technical solutions of the embodiments of the application and the prior art, drawings needed in the embodiments and the prior art will be briefly described below. Obviously, the drawings described below are for only some embodiments of the present application, one of ordinary skills in the art can also obtain other drawings based on these drawings without any creative efforts.

DETAILED DESCRIPTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

The application is to provide a network time correction method and apparatus, which is capable of reducing the amount of redundant data in the network while ensuring the accuracy of device time.

A network time correction method according to an embodiment of the application is first introduced below.

The network time correction method according to the embodiment of the application may be performed by a network device, which includes a chip for correcting time, such as DSP (Digital Signal Processor), ARM (Advanced Reduced Instruction Set Computer Machines), or FPGA (Field-Programmable Gate Array) and so on. The network time correction method according to the embodiment of this application may be implemented in at least one of a software, a hardware circuit and a logic circuit of a chip in a time correction device.

Figure 1:
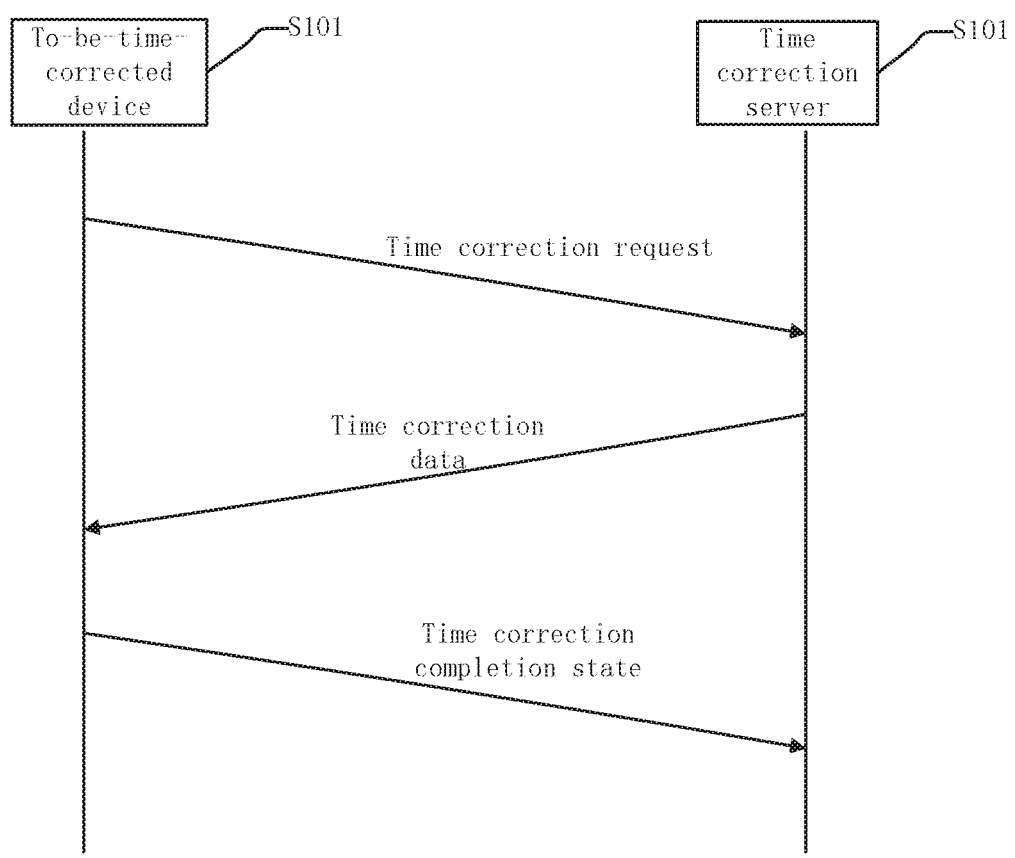
FIG. 1 is a flow chart of the NTP protocol in the prior art.
Figure 2:
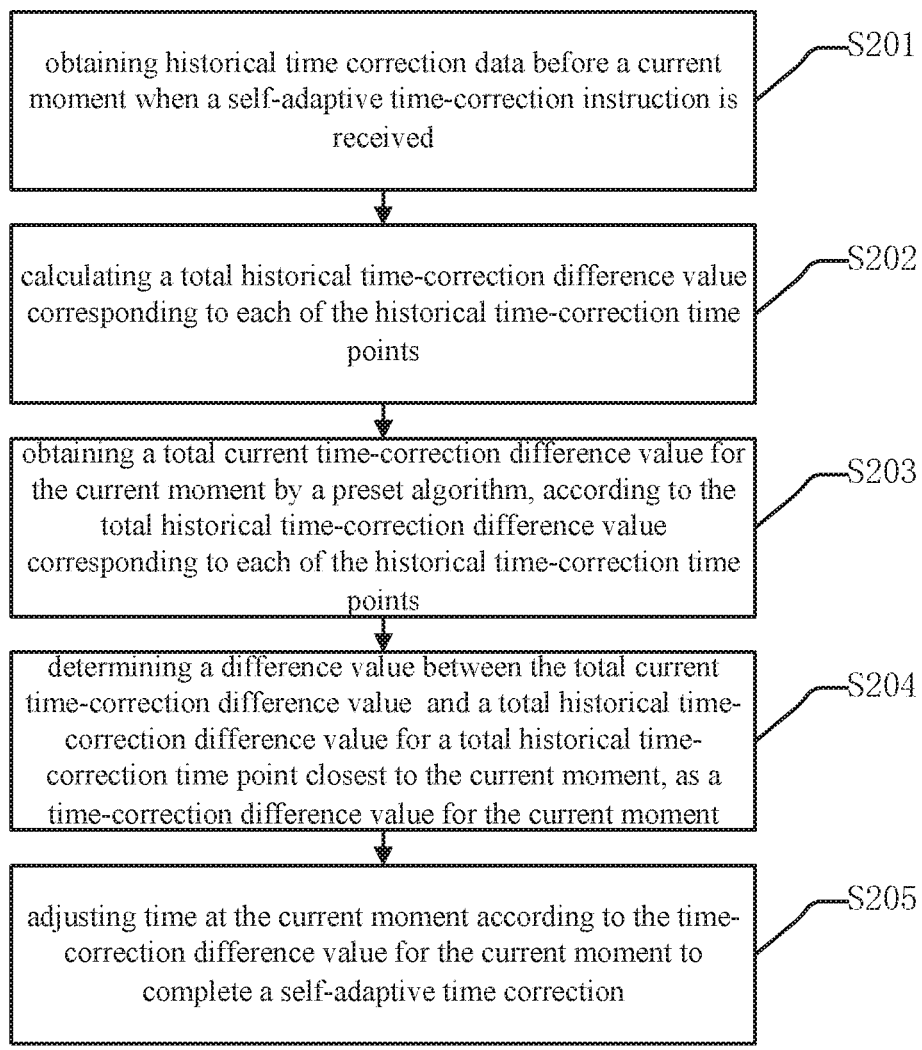
FIG. 2 is a flow chart of a network time correction method according to an embodiment of the present application.

As shown in FIG. 2, a network time correction method according to an embodiment of the application may include S201-S205.

At S201, when a self-adaptive time-correction instruction is received, historical time correction data before a current moment is obtained.

The historical time correction data includes: each of historical time-correction time points, and a time-correction difference value corresponding to each of the historical time-correction time points. The historical time-correction time points may be orders of historical time corrections determined in chronological order of the historical time corrections, such as first historical time correction, second historical time correction, third historical time correction, and so on. In order to ensure the accuracy of time correction, it is generally necessary to record time correction data of a certain number of time points, such as 16 or 32 time points. The historical time-correction time points may also be a moment at which each of the historical time corrections is performed. The historical time correction data may be recorded periodically or non-periodically, which is not limited here.

The network time correction method according to the embodiment of the application is mainly divided into two stages. In the first stage, the historical time correction data is accumulated. In the second stage, self-adaptive time correction is performed. In the network time correction method, some historical time correction data needs to be accumulated first for statistical analysis, and the self-adaptive time correction is then performed.

Optionally, the self-adaptive time-correction instruction may be generated based on a user input, or generated periodically according to a preset self-adaptive time-correction period.

The self-adaptive time correction means that statistical analysis is performed on the historical time correction data by linear fitting technology and time correction data for a certain future time is calculated. In order to start a self-adaptive time correction by a self-adaptive time-correction instruction, the adaptive time correction instruction may be generated in response to a start instruction inputted by a user when he or she determines that the self-adaptive time correction needs to be performed, or may be generated periodically according to a time correction period that has been set in advance. For example, the time correction period may set in advance in such a way that a self-adaptive time correction is performed when 16 pieces of historical time correction data are accumulated. In this case, the adaptive time correction instruction is automatically generated when the number of pieces of accumulated historical time correction data reaches 16.

Optionally, the network time correction method may also include:

before receiving a first self-adaptive time-correction instruction, performing, by a time correction server, server network time corrections according to a preset first network time correction period, and storing a time-correction time point of each of the server network time corrections and a time-correction difference value corresponding to the time-correction time point of this server network time correction as historical time correction data.

The preset first network time correction period is a preset period for recording historical time correction data. Before the first self-adaptive time-correction instruction is received, it is necessary to accumulate the historical time correction data. In the embodiment, the historical time correction data is recorded according to the preset period. The accumulated historical time correction data is obtained by a to-be-time-corrected device through interaction with the time correction server. In the process of the interaction between the to-be-time-corrected device and the time correction server, the to-be-time-corrected device sends a time correction request to the time correction server in the network; after receiving the time correction request, the time correction server sends the time correction data to the to-be-time-corrected device; when receiving the time correction data, the to-be-time-corrected device reconfigures its device time according to the time correction data and sends a time correction completion instruction to the time correction server. In addition to the above process of the interaction between the to-be-time-corrected device and the time correction server, the interaction between the to-be-time-corrected device and the time correction server can be implemented in other ways, which belong to the scope of the embodiment of this application, and are not listed here.

Specifically, the step of performing, by a time correction server, server network time corrections according to a preset first network time correction period, and storing a time-correction time point of each of the server network time corrections and a time-correction difference value corresponding to the time-correction time point of this server network time correction as historical time correction data includes the following four steps.

At the first step, a plurality of sets of time correction information are obtained.

Time correction information is time information, that is, the time when the to-be-time-corrected network device sends the time correction request and the time when the time correction server receives the time correction request and sends the time correction data. The time correction information specifically includes: first time T1 when the to-be-time-corrected network device sends the time correction request to the time correction server, second time T2 when the time correction server receives the time correction request, and third time T3 when the time correction server sends the time correction data to the to-be-time-corrected network device, and fourth time T4 when the to-be-time-corrected network device receives the time correction data. The time correction data includes time-correction server time obtained by the time correction server after analyzing the time correction request.

At the second step, a time-correction time point of a server network time correction corresponding to the second time T2 or the third time T3 in each of the sets of time correction information is obtained.

In order to ensure a recording order of historical time correction data, the second time T2 when the time correction server receives the time correction request or the third time T3 when the time correction server sends the time correction data are usually set as a time-correction time point, or a time correction order corresponding to T2 or T3 are set as the time-correction time point.

At the third step, a time-correction difference value corresponding to the time-correction time point of each of the server network time corrections is determined according to each of the sets of time correction information.

Optionally, the step of determining a time-correction difference value corresponding to the time-correction time point of each of the server network time corrections according to each of the sets of time correction information includes:

calculating a first difference value between the second time T2 and the first time T1 in each of the sets of time correction information, and a second difference value between the fourth time T4 and the third time T3 in each of the sets of time correction information; and dividing a difference between the first difference value and the second difference value by 2, to obtain the time-correction difference value corresponding to the time-correction time point of each of the server network time corrections.

Specifically, the time-correction difference value corresponding to the time-correction time point of each of the server network time corrections can be calculated by using formula (1).

$$\theta = \frac{(T2 - T1) - (T4 - T3)}{2} \quad (1)$$

Wherein, θ is the time-correction difference value corresponding to the time-correction time point of each of the server network time corrections, T2 is the second time when the time correction server receives the time correction request, T1 is the first time when the to-be-time-corrected network device sends the time correction request to the time correction server, T4 is the fourth time when the to-be-time-corrected network device receives the time correction data, T3 is the third time when the time correction server sends the time correction data to the to-be-time-corrected network device.

At the fourth step, the time-correction time point of each of the network server time corrections and the time-correction difference value corresponding to the time-correction time point of each of the server network time corrections are stored as historical time correction data.

The historical time correction data includes the time-correction time point of each of the server network time corrections and the time-correction difference value corresponding to the time-correction time point of this server network time correction. That is to say, the time-correction difference value for each time-correction time point is stored as the historical time correction data.

Optionally, the network time correction method according to the embodiment of the present application may further include:

after receiving the first self-adaptive time-correction instruction, prolonging the preset first network time correction period to a preset duration, and performing a server network time correction by the time correction server according to the preset duration, to obtain a first time-correction time point corresponding to this server time correction and a time-correction difference value corresponding to the first time-correction time point;

if the number of pieces of historical time correction data is less than a preset number, storing the first time-correction time point and the time-correction difference value corresponding to the first time-correction time point as historical time correction data; and if the number of pieces of historical time correction data is equal to the preset number, deleting the earliest historical time-correction time point in the historical time correction data and a time-correction difference value corresponding to the earliest historical time-correction time point, and storing the first time-correction time point and the time-correction difference value corresponding to the first time-correction time point as historical time correction data.

The self-adaptive time correction is performed on the to-be-time-corrected network device on the basis of accumulating historical time correction data. In this way, the time correction period between the to-be-time-corrected network device and the time correction server may be prolonged. In the subsequent server network time correction, the amount of data generated by the method according to the embodiment is less than that generated by the existing time correction method, thus reducing network redundancy.

The number of pieces of historical time correction data is generally set to the preset number. If the self-adaptive time correction is started by the self-adaptive time-correction instruction input by the user, the number of pieces of recorded historical time correction data may not reach the preset number. If the number of pieces of the recorded historical time correction data does not reach the preset number, the newly recorded server network time correction data may be stored as historical time correction data. If the number of pieces of the recorded historical time correction data has reached the preset number, it is necessary to delete the earliest historical time correction data from original historical time correction data, and then store the newly recorded server network time correction data as historical time correction data.

At S202, a total historical time-correction difference value corresponding to each of the historical time-correction time points is calculated.

Each of the historical time-correction time points corresponds to a time-correction difference value. In order to calculate a time-correction difference value for a future moment adaptively, it is necessary to first calculate a total historical time-correction difference value corresponding to each of the historical time-correction time points.

Optionally, the step of calculating a total historical time-correction difference value corresponding to each of the historical time-correction time points includes:

obtaining a self-adaptive time-correction flag and determining whether a self-adaptive time correction has been performed according to the self-adaptive time-correction flag;

if the self-adaptive time correction has not been performed, calculating the sum of the time-correction difference value for each of the historical time-correction time points and the time-correction difference values for all historical time-correction time points before this historical time-correction time point, to obtain the total historical time-correction difference value corresponding to this historical time-correction time point; and if the self-adaptive time correction has been performed, adding the sum of the time-correction difference value for each of the historical time-correction time points and the time-correction difference values for all historical time-correction time points before this historical time-correction time point with a time-correction difference value for the self-adaptive time correction that has been performed, to obtain the total historical time-correction difference value corresponding to this historical time-correction time point.

The self-adaptive time correction affects a total historical time-correction difference value for a historical time-correction time point. Therefore, when calculating the total historical time-correction difference value, it is necessary to determine whether self-adaptive time correction has been performed or not. If the self-adaptive time correction has not been performed, then the total historical time-correction difference value corresponding to each of the historical time-correction time points is calculated according to formula (2). If the self-adaptive time correction has been performed, then the total historical time-correction difference value corresponding to each of the historical time-correction time points is calculated according to formula (3).

$$T_n = \sum_{i=1}^{n} t_i \quad (2)$$

wherein, $T_n$ is the total historical time-correction difference value corresponding to the n-th historical time-correction time point, $t_i$ is the time-correction difference value for the i-th historical time-correction time point, $$\sum_{i=1}^{n} t_i$$

is the sum of time-correction difference values for all historical time-correction time points before the n-th historical time-correction time point.

$$T_n = \sum_{i=1}^{n} t_i + t' \quad (3)$$

wherein, $T_n$ is the total historical time-correction difference value corresponding to the n-th historical time-correction time point, $t_i$ is the time-correction difference value for the i-th historical time-correction time point, $$\sum_{i=1}^{n} t_i$$

is the sum of time-correction difference values for all historical time-correction time points before the n-th historical time-correction time point, t' is a time-correction difference value for the self-adaptive time correction that has been performed.

S203, a total current time-correction difference value for the current moment is obtained by a preset algorithm, according to the total historical time-correction difference value corresponding to each of the historical time-correction time points.

In this embodiment, the time correction data for the current moment is calculated by analyzing the historical time correction data through a linear fitting technique. The time-correction difference value for the current moment is obtained by subtracting a total historical time-correction difference value $T_{m-1}$ for a previous moment from the total current time-correction difference value $T_m$ for the current moment, that is, the time-correction difference value for the current moment is $t_m = T_m - T_{m-1}$. The time correction is performed for the obtained time-correction difference value in the to-be-time-corrected network device. Therefore, before the to-be-time-corrected network device is reconfigured, it is necessary to obtain the total current time-correction difference value for the current moment.

In the embodiment, the statistical analysis is performed on the historical time correction data by the linear fitting method. The least square method is the most commonly used linear fitting method. Of course, other linear fitting methods may be used, which falls into the protection scope of the embodiment of this application.

Optionally, taking the least square method as an example, the step of obtaining a total current time-correction difference value for the current moment by a preset algorithm, according to the total historical time-correction difference value corresponding to each of the historical time-correction time points may include the following steps.

At the first step, an average time-correction time point of all the historical time-correction time points is determined.

Assuming that there are the number n of the historical time-correction time points. The average time-correction time point may be an average of the orders of all historical time corrections. The average time-correction time point is $$\bar{x} = \frac{\sum_{i=1}^{n} i}{n},$$

wherein, $\bar{x}$ is the average time-correction time point of all historical time-correction time points, $$\sum_{i=1}^{n} i$$

is the sum of all historical time-correction time points, and i is the i-th historical time-correction time point.

At the second step, an average total time-correction difference value for all historical time-correction time points is determined according to the total historical time-correction difference values corresponding to each of the historical time-correction time points.

Assuming that the total number of historical time-correction time points is n, the average total time-correction difference value is $$\bar{y} = \frac{\sum_{i=1}^{n} T_i}{n},$$

wherein, $\bar{y}$ is the average total time-correction difference value for all the historical time-correction time points, $$\sum_{i=1}^{n} T_i$$

is the sum of total historical time-correction difference values for all the historical time-correction time points, and i is the i-th historical time-correction time point.

At the third step, a first parameter is obtained by a formula (4), according to each of the historical time-correction time points, the total historical time-correction difference value corresponding to each of the historical time-correction time points, the average time-correction time Point and the average total time-correction difference value.

The formula (4) is:

$$b = \frac{\sum_{i=1}^{n}(x_i y_i - n\bar{x}\bar{y})}{\sum_{i=1}^{n} x_i^2 - n\bar{x}^2} \quad (4)$$

where b is the first parameter, $x_i$ is the i-th historical time-correction time point, $y_i$ is a time-correction difference value for the i-th historical time-correction time point, n is the total number of the historical time-correction time points, $\bar{x}$ is the average time-correction time point, and $\bar{y}$ is the average total time-correction difference value.

At the fourth step, a second parameter is obtained by a formula (5) according to the average time-correction time point, the average total time-correction difference value and the first parameter.

The formula (5) is:

$$a = \bar{y} - b\bar{x} \quad (5)$$

where a is the second parameter, $\bar{y}$ is the average total time-correction difference value, b is the first parameter, and $\bar{x}$ is the average time-correction time point.

At the fifth step, the first and second parameters are substituted into a formula (6) and the total current time-correction difference value for the current moment is obtained by the formula (6) according to the time-correction time point of the current moment.

Specifically, the formula (6) is a linear fitting equation:

$$y = bx + a \quad (6)$$

where, y is the total current time-correction difference value for the current moment, b is the first parameter, x is the time-correction time point of the current moment, and a is the second parameter.

S204, a difference value between the total current time-correction difference value and the total historical time-correction difference value for a historical time-correction time point closest to the current moment is determined as a time-correction difference value for the current moment.

In the embodiment, the time correction data for the current moment is calculated by analyzing the historical time-correction data through the linear fitting technique. The time-correction difference value for the current moment is obtained by subtracting a total historical time-correction difference value $T_{m-1}$ for the previous moment from the total current time-correction difference value T for the current moment, that is, the time-correction difference value for the current moment is $t_m = T_m - T_{m-1}$. The time correction is performed for the obtained time-correction difference value in the to-be-time-corrected network device.

S205, time at the current moment is adjusted according to the time-correction difference value for the current moment, to complete the self-adaptive time correction.

The time-correction difference value for the current moment is a time difference value between the to-be-time-corrected network device and the time correction server at the current moment. The time difference value may be positive or negative. When the time difference value is positive, the adjusting of the current moment means that the time-correction difference value for the current moment is added to the time of the to-be-time-corrected network device at the current moment. When the time difference value is negative, the adjusting of the current moment means that the absolute value of the time-correction difference value for the current moment is subtracted from the time of the network to-be-time-corrected device at the current moment.

Optionally, the step of adjusting time at the current moment according to the time-correction difference value for the current moment, to complete the self-adaptive time correction may include:

adding the current moment to the time-correction difference value for the current moment to obtain target time-correction time for the current moment; and adjusting the time at the current moment to the target time-correction time to complete the self-adaptive time correction.

The target time-correction time for the current moment is the sum of the time at the current moment and the time-correction difference value for the current moment, regardless of whether the time-correction difference value for the current moment is positive or negative. When the time-correction difference value is positive, the positive time-correction difference value is added to the time at the current moment. When the time-correction difference value is negative, the negative time-correction difference value is added to the time at the current moment. The adjusting of the time at the current moment means that the time of the to-be-time-corrected network device at the current moment is adjusted as the target time-correction time, which will not be repeated here.

The network time correction method according to the embodiment of the application may also be executed by a chip in the time correction server, or a time correction controller independent of the time correction device and the time correction server. The chip in the time correction server or the time correction controller may also reduce the amount of redundant data in the network to a certain extent.

In the embodiment of the application, the total time-correction difference value for each historical time-correction time point is obtained by accumulating the historical time correction data, and summing the time-correction difference values in the historical time correction data; the time-correction difference value for the current moment is obtained by preset algorithm; and the time at the current moment is adjusted according to the time-correction difference value for the current moment. The scheme according to the embodiment has higher real-time performance and ensures the accuracy of the device time. Moreover, it can reduce the amount of redundant data in the network, since only a small amount of historical data is required to accumulate, that is, less time correction data packets are transmitted between the time correction device and the server. Furthermore, on the basis of accumulating historical time correction data, the self-adaptive time correction is performed on the to-be-time-corrected network device, which may prolong the time correction period between the to-be-time-corrected network device and the time correction server. That is to say, in the next server network time correction, the time correction frequency may be reduced, thereby reducing network redundancy. In the case that there are multiple to-be-time-corrected network devices in the network, the time differences among the multiple to-be-time-corrected network devices are reduced, and the accuracy and synchronization of the time of all to-be-time-corrected network devices are improved.

The network time correction method according to the embodiment of the present application is introduced below with reference to specific examples.

Figure 3:
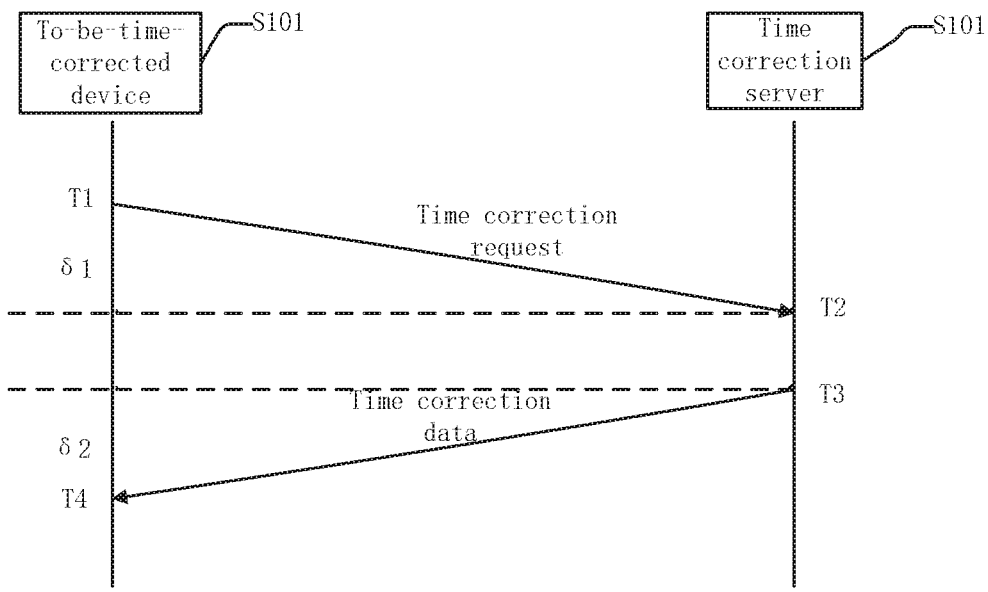
FIG. 3 is a schematic diagram of a process of recording historical time correction data each time according to an embodiment of the present application.

FIG. 3 shows a process of recording each piece of historical time correction data according to the embodiment. A to-be-time-corrected network device 101 sends a time correction request to a time correction server 102 and records time T1 when the time correction request is sent. The time correction server 102 receives the time correction request, and records time T2 when the time correction request is received. The time correction server 102 analyses the time correction request, sends the time correction data to the to-be-time-corrected network device 101, and records time T3 when the time correction data is sent. The to-be-time-corrected network device 101 receives the time correction data and records the time T4 when the time correction data is received. The time correction data between the to-be-time-corrected network device 101 and the time correction server satisfies the following formula (7):

$$\begin{cases} T2 = T1 + \theta + \delta 1 \\ T4 = T3 - \theta + \delta 2 \\ \delta = \delta 1 + \delta 2 \end{cases} \quad (7)$$

where T2 is the time when the time correction server 102 receives the time correction request sent by the to-be-time-corrected network device 101; T1 is the time when the to-be-time-corrected network device 101 sends the time correction request; $\theta$ is the time-correction difference value of the to-be-time-corrected network device 101 with respect to the time correction server 102 at time T1; $\delta 1$ is the time consumed by the transmission of the time correction request over the network; T4 is the time when the time correction server 102 sends the time correction data; T3 is the time when the to-be-time-corrected network device 101 receives the time correction data sent by the time correction server 102; $\delta 2$ is the time consumed by the transmission of the time correction data over the network; $\delta$ is a round-trip transmission delay between the to-be-time-corrected network device 101 and the time correction server 102. The time correction data includes the time-correction difference value of the to-be-time-corrected network device 101 with respect to the time correction server 102 at time T1.

Assuming that the time consumed by the transmission of the time correction request over the network is the same as the time consumed by the transmission of the time correction data over the network, that is, $\delta 1 = \delta 2$, the formula (8) can be obtained based on the formula (7):

$$\begin{cases} \theta = \dfrac{(T2 - T1) - (T4 - T3)}{2} \\ \delta = (T2 - T1) + (T4 - T3) \end{cases} \quad (8)$$

It can be seen that the time-correction difference value $\theta$ of the to-be-time-corrected network device 101 with respect to the time correction server 102 at time T1 and the round-trip transmission delay $\delta$ between the to-be-time-corrected network device 101 and the time correction server 102 are only related to the difference value between the time T2 when the time correction server 102 receives the time correction request sent by the to-be-time-corrected network device 101 and the time T1 when the to-be-time-corrected network device 101 sends the time correction request, and the difference value between the time T4 when the time correction server 102 sends the time correction data and the time T3 when the to-be-time-corrected network device 101 receives the time correction data sent by the time correction server 102.

Assuming that the recorded historical time correction data includes the time correction data of 32 historical time-correction time points, wherein the time-correction difference value of each of historical time-correction time points is 2.1 seconds; the historical time-correction time points are set to orders of historical time corrections determined in chronological order of the historical time corrections, and the average time-correction time point of the historical time-correction time points is an average value of the orders of all the historical time corrections. The average time-correction time point of all the historical time-correction time points is:

$$\bar{x} = \dfrac{\sum_{i=1}^{32} i}{32} = 16.5,$$

the average total time-correction difference value of all the historical time-correction time points is:

$$\bar{y} = \dfrac{2.1 \times \sum_{i=1}^{32} i}{32} = 34.65.$$

Figure 4:
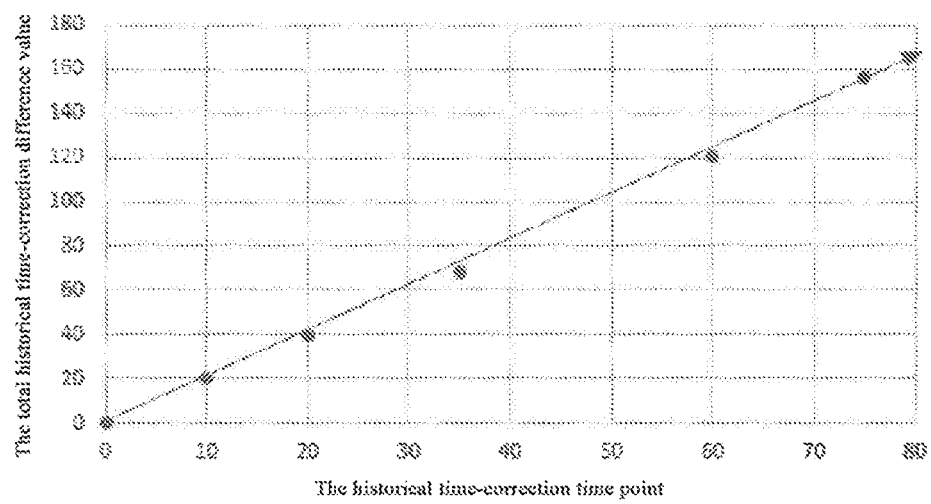
FIG. 4 is a schematic diagram of a linear fitting curve according to an embodiment of the present application.

By calculation, the first parameter b=2.1 and the second parameter a=0 can be obtained, and thus the linear fitting equation y=2.1x can be obtained. The linear fitting curve as shown in FIG. 4 can be obtained. The abscissa of the curve shown in FIG. 4 is the orders of historical time-correction time points, and the ordinate of the curve is a total historical time-correction difference value corresponding to each of the historical time-correction time points.

The total current time-correction difference value for the current moment is calculated by self-adaptive time correction: y=2.1×11=23.1 seconds, and the time-correction difference value for the current moment is: 23.1−21=2.1 seconds. Therefore, the target time of the to-be-time-corrected network device at the current moment is the current moment plus 2.1 seconds.

In the scheme of the application, the total time-correction difference value for each historical time-correction time point is obtained by accumulating the historical time correction data, and summing the time-correction difference values in the historical time correction data; the time-correction difference value for the current moment is obtained by preset algorithm; and the time at the current moment is adjusted according to the time-correction difference value for the current moment. Compared with the existing technologies, the scheme of the application has higher real-time performance and ensures the accuracy of the device time. Moreover, the scheme can reduce the amount of redundant data in the network, since only a small amount of historical data is required to accumulate, that is, less time correction data packets are transmitted between the time correction device and the server.

Figure 5:
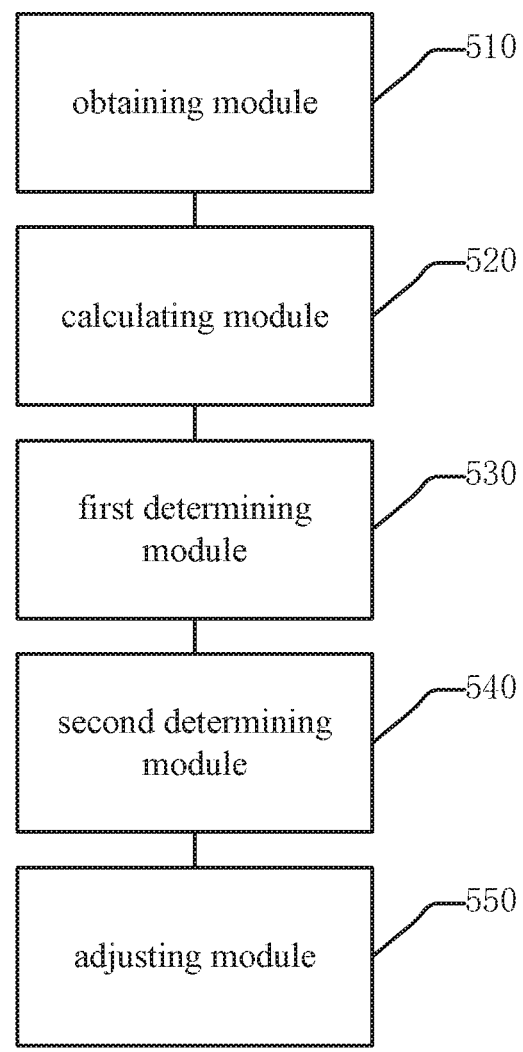
FIG. 5 is a schematic diagram of a network time correction apparatus according to an embodiment of the present application.

Corresponding to the above embodiments, an embodiment of the application provides a network time correction apparatus. As shown in FIG. 5, the network time correction apparatus may include:

an obtaining module 510, configured for obtaining historical time correction data before a current moment when a self-adaptive time-correction instruction is received, wherein the historical time correction data comprises: each of historical time-correction time points, and a time-correction difference value corresponding to each of the historical time-correction time points;

a calculating module 520, configured for calculating a total historical time-correction difference value corresponding to each of the historical time-correction time points;

a first determining module 530, configured for obtaining a total current time-correction difference value for the current moment by a preset algorithm, according to the total historical time-correction difference value corresponding to each of the historical time-correction time points;

a second determining module 540, configured for determining a difference value between the total current time-correction difference value for the current moment and a total historical time-correction difference value for a historical time-correction time point closest to the current moment, as a time-correction difference value for the current moment; and an adjusting module 550, configured for adjusting time at the current moment according to the time-correction difference value for the current moment to complete a self-adaptive time correction.

In the embodiment, the total time-correction difference value for each historical time-correction time point is obtained by accumulating the historical time correction data, and summing the time-correction difference values in the historical time correction data; the time-correction difference value for the current moment is obtained by preset algorithm; and the time at the current moment is adjusted according to the time-correction difference value for the current moment. The scheme of the embodiment has higher real-time performance and ensures the accuracy of the device time. Moreover, the scheme can reduce the amount of redundant data in the network, since only a small amount of historical data is required to accumulate, that is, less time correction data packets are transmitted between the time correction device and the server.

Optionally, the self-adaptive time-correction instruction is generated based on a user input, or is generated periodically according to a preset self-adaptive time-correction period.

Optionally, the apparatus may further include:

a first storing module, configured for, before the first self-adaptive time-correction instruction is received, performing server network time corrections by a time correction server according to a preset first network time-correction period, and storing a time-correction time point of each of the server network time corrections and a time-correction difference value corresponding to the time-correction time point of this server network time correction, as historical time correction data;

a third determining module, configured for, after the first self-adaptive time-correction instruction is received, prolonging the preset first network time-correction period to a preset duration, and performing a server network time correction by the time correction server according to the preset duration to obtain a first time-correction time point corresponding to this server network time correction and a time-correction difference value corresponding to the first time-correction time point;

a second storing module, configured for, if the number of pieces of the historical time correction data is less than a preset number, storing the first time-correction time point and the time-correction difference value corresponding to the first time-correction time point as historical time correction data; and a third storing module, configured for, if the number of pieces of the historical time correction data is equal to the preset number, deleting the earliest historical time-correction time point in the historical time correction data and a time-correction difference value corresponding to the earliest historical time-correction time point, and storing the first time-correction time point and the time-correction difference value corresponding to the first time-correction time point as historical time correction data.

Optionally, the first storage module may include:

a first obtaining sub-module, configured for obtaining a plurality of sets of time correction information, wherein the time correction information comprises: first time T1 when a to-be-time-corrected network device sends a time correction request to the time correction server, second time T2 when the time correction server receives the time correction request, third time T3 when the time correction server sends time correction data to the to-be-time-corrected network device, and fourth time T4 when the to-be-time-corrected network device receives the time correction data, and the time correction data comprises: time-correction server time obtained by the time correction server after analyzing the time correction request;

a second obtaining sub-module, configured for obtaining a time-correction time point of a server network time correction corresponding to the second time T2 or the third time T3 in each of the sets of time correction information;

a first determining sub-module, configured for determining a time-correction difference value corresponding to a time-correction time point of each of the server network time corrections, according to each of the sets of time correction information; and a storing sub-module, configured for storing the time-correction time point of each of the server network time corrections and the time-correction difference value corresponding to the time-correction time point of this server network time correction as historical time correction data.

Optionally, the first determining sub-module may include:

a calculating unit, configured for calculating a first difference value between the second time T2 and the first time T1 in each of the sets of time correction information, and a second difference value between the fourth time T4 and the third time T3 in each of the sets of time correction information;

a determining unit, configured for dividing a difference between the first difference value and the second difference value by 2, to obtain the time-correction difference value corresponding to the time-correction time point of each of the server network time corrections.

Optionally, the calculating module 520 may include:

a judging sub-module, configured for obtaining a self-adaptive time-correction flag and determining whether a self-adaptive time correction has been performed according to the self-adaptive time-correction flag;

a second determining sub-module, configured for, if the self-adaptive time correction has not been performed, calculating the sum of the time-correction difference value for each of the historical time-correction time points and the time-correction difference values for all historical time-correction time points before this historical time-correction time point, to obtain the total historical time-correction difference value corresponding to this historical time-correction time point; and a third determining sub-module, configured for, if the self-adaptive time correction has been performed, adding the sum of the time-correction difference value for each of the historical time-correction time points and the time-correction difference values for all historical time-correction time points before this historical time-correction time point with a time-correction difference value for the self-adaptive time correction that has been performed, to obtain the total historical time-correction difference value corresponding to this historical time-correction time point.

Optionally, the first determining module 530 may include:

an average time-correction time point determining sub-module, configured for determining an average time-correction time point of all the historical time-correction time points;

an average total time-correction difference value determining sub-module, configured for determining an average total time-correction difference value for all the historical time-correction time points, according to the total historical time-correction difference value corresponding to each of the historical time-correction time points;

a first parameter determining sub-module, configured for obtaining a first parameter by a first calculation formula, according to each of the historical time-correction time points, the total historical time-correction difference value corresponding to each of the historical time-correction time points, the average time-correction time point and the average total time-correction difference value, wherein the first calculation formula is:

$$b = \frac{\sum_{i=1}^{n}(x_i y_i - n\bar{x}\bar{y})}{\sum_{i=1}^{n} x_i^2 - n\bar{x}^2},$$

where, b is the first parameter, $x_i$ is the i-th historical time-correction time point, $y_i$ is a time-correction difference value for the i-th historical time-correction time point, n is the total number of the historical time-correction time points, $\bar{x}$ is the average time-correction time point, $\bar{y}$ is the average total time-correction difference value;

a second parameter determining sub-module, configured for obtaining a second parameter by a second calculation formula, according to the average time-correction time point, the average total time-correction difference value and the first parameter, wherein the second calculation formula is:

$$a = \bar{y} - b\bar{x}$$

where, a is the second parameter, $\bar{y}$ is the average total time-correction difference value, b is the first parameter, $\bar{x}$ is the average time-correction time point;

a total current time-correction difference value determining sub-module, configured for obtaining a total current time-correction difference value y for the current moment by substituting the first parameter and the second parameter into the following linear fitting equation:

$$y = bx + a$$

where, y is the total current time-correction difference value for the current moment, b is the first parameter, x is the time-correction time point of the current moment, and a is the second parameter.

Optionally, the adjusting module 550 may include:

a target time-correction time determining sub-module, configured for adding the current moment to the time-correction difference value for the current moment to obtain a target time-correction time for the current moment; and an adjusting sub-module, configured for adjusting the time at the current moment to the target time-correction time to complete the self-adaptive time correction.

The network time correction apparatus according to the embodiment is an apparatus using the network time correction method described above. Thus all embodiments of the network time correction method are applicable to the apparatus, and the same or similar beneficial effects can be achieved.

In addition, corresponding to the network time correction method according to the above embodiment, an embodiment of the application provide a storage medium for storing executable code which, when executed, performs the network time correction method according to the embodiment of the application. specifically, the network time correction method includes:

obtaining historical time correction data before a current moment when a self-adaptive time-correction instruction is received, wherein the historical time correction data comprises: each of historical time-correction time points, and a time-correction difference value corresponding to each of the historical time-correction time points;

calculating a total historical time-correction difference value corresponding to each of the historical time-correction time points;

obtaining a total current time-correction difference value for the current moment by a preset algorithm, according to the total historical time-correction difference value corresponding to each of the historical time-correction time points;

determining a difference value between the total current time-correction difference value for the current moment and a total historical time-correction difference value for a total historical time-correction time point closest to the current moment, as a time-correction difference value for the current moment; and adjusting time at the current moment according to the time-correction difference value for the current moment to complete a self-adaptive time correction.

In the present embodiment, the storage medium stores an application program which, when executed, performs the network time correction method according to the embodiment of the application. In the method, the total time-correction difference value for each historical time-correction time point is obtained by accumulating the historical time correction data, and summing the time-correction difference values in the historical time correction data; the time-correction difference value for the current moment is obtained by a preset algorithm; and the time at the current moment is adjusted according to the time-correction difference value for the current moment. The scheme of the embodiment has higher real-time performance and ensures the accuracy of the device time. Moreover, the scheme can reduce the amount of redundant data in the network, since only a small amount of historical data is required to accumulate, that is, less time correction data packets are transmitted between the time correction device and the server.

In addition, corresponding to the network time correction method according to the above embodiment, an embodiment of the application provide an application program which, when executed, performs the network time correction method according to the embodiment of the application. specifically, the network time correction method includes:

obtaining historical time correction data before a current moment when a self-adaptive time-correction instruction is received, wherein the historical time correction data comprises: each of historical time-correction time points, and a time-correction difference value corresponding to each of the historical time-correction time points;

calculating a total historical time-correction difference value corresponding to each of the historical time-correction time points;

obtaining a total current time-correction difference value for the current moment by a preset algorithm, according to the total historical time-correction difference value corresponding to each of the historical time-correction time points;

determining a difference value between the total current time-correction difference value for the current moment and a total historical time-correction difference value for a total historical time-correction time point closest to the current moment, as a time-correction difference value for the current moment; and adjusting time at the current moment according to the time-correction difference value for the current moment to complete a self-adaptive time correction.

In this embodiment, the application program, when executed, performs the network time correction method according to the embodiment of the application. In the method, the total time-correction difference value for each historical time-correction time point is obtained by accumulating the historical time correction data, and summing the time-correction difference values in the historical time correction data; the time-correction difference value for the current moment is obtained by a preset algorithm; and the time at the current moment is adjusted according to the time-correction difference value for the current moment. The scheme of the embodiment has higher real-time performance and ensures the accuracy of the device time. Moreover, the scheme can reduce the amount of redundant data in the network, since only a small amount of historical data is required to accumulate, that is, less time correction data packets are transmitted between the time correction device and the server.

In addition, corresponding to the network time correction method according to the above embodiments, an embodiment of the application provides a network device, including a processor, a memory, a communication interface and a bus.

The processor, the memory, and the communication interface are connected and communicate with each other via the bus.

The memory stores executable program code.

The processor executes a program corresponding to the executable application code by reading the executable application code stored in the memory to execute the network time correction method according to the embodiment of the application. Specifically, the network time correction method includes:

obtaining historical time correction data before a current moment when a self-adaptive time-correction instruction is received, wherein the historical time correction data comprises: each of historical time-correction time points, and a time-correction difference value corresponding to each of the historical time-correction time points;

calculating a total historical time-correction difference value corresponding to each of the historical time-correction time points;

obtaining a total current time-correction difference value for the current moment by a preset algorithm, according to the total historical time-correction difference value corresponding to each of the historical time-correction time points;

determining a difference value between the total current time-correction difference value for the current moment and a total historical time-correction difference value for a total historical time-correction time point closest to the current moment, as a time-correction difference value for the current moment; and adjusting time at the current moment according to the time-correction difference value for the current moment to complete a self-adaptive time correction.

In the present embodiment, the processor of the network device executes a program corresponding to the executable application code by reading the executable application code stored in the memory to perform the network time correction method according to the embodiment of the application. In the method, the total time-correction difference value for each historical time-correction time point is obtained by accumulating the historical time correction data, and summing the time-correction difference values in the historical time correction data; the time-correction difference value for the current moment is obtained by a preset algorithm; and the time at the current moment is adjusted according to the time-correction difference value for the current moment. The scheme of the embodiment has higher real-time performance and ensures the accuracy of the device time. Moreover, the scheme can reduce the amount of redundant data in the network, since only a small amount of historical data is required to accumulate, that is, less time correction data packets are transmitted between the time correction device and the server.

For network device, application program, and storage medium embodiments, the description is relatively simple because the method content involved is basically similar to the method embodiments described above, and the relevant points can be referred to in part of the description of the method embodiments.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which include these elements.

All of the embodiments in the description are described in a correlated manner, and identical or similar parts in various embodiments can refer to one another. In addition, the description for each embodiment focuses on the differences from other embodiments. In particular, for system embodiments, since they are basically similar to method embodiments, the description is relatively simple, and the relevant points can be referred to in part of the description of method embodiments.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

What is claimed is:

1. A network time correction method, comprising:
    obtaining historical time correction data before a current moment when a self-adaptive time-correction instruction is received, wherein the historical time correction data comprises: each of historical time-correction time points, and a time-correction difference value corresponding to each of the historical time-correction time points;
    calculating a total historical time-correction difference value corresponding to each of the historical time-correction time points;
    obtaining a total current time-correction difference value for the current moment by a preset algorithm, according to the total historical time-correction difference value corresponding to each of the historical time-correction time points;
    determining a difference value between the total current time-correction difference value for the current moment and a total historical time-correction difference value for a historical time-correction time point closest to the current moment, as a time-correction difference value for the current moment; and
    adjusting time at the current moment according to the time-correction difference value for the current moment to complete a self-adaptive time correction.

2. The method of claim 1, wherein the self-adaptive time-correction instruction is generated based on a user input, or is generated periodically according to a preset self-adaptive time-correction period.

3. The method of claim 1, further comprising:
    before receiving the first self-adaptive time-correction instruction, performing server network time corrections by a time correction server according to a preset first network time-correction period, and storing a time-correction time point of each of the server network time corrections and a time-correction difference value corresponding to the time-correction time point of this server network time correction, as historical time correction data;
    after receiving the first self-adaptive time-correction instruction, prolonging the preset first network time-correction period to a preset duration, and performing a server network time correction by the time correction server according to the preset duration to obtain a first time-correction time point corresponding to this server network time correction and a time-correction difference value corresponding to the first time-correction time point;
    if the number of pieces of the historical time correction data is less than a preset number, storing the first time-correction time point and the time-correction difference value corresponding to the first time-correction time point as historical time correction data; and
    if the number of pieces of the historical time correction data is equal to the preset number, deleting the earliest historical time-correction time point in the historical time correction data and a time-correction difference value corresponding to the earliest historical time-correction time point, and storing the first time-correction time point and the time-correction difference value corresponding to the first time-correction time point as historical time correction data.

4. The method of claim 3, wherein, performing server network time corrections by a time correction server according to a preset first network time-correction period, and storing a time-correction time point of each of the server network time corrections and a time-correction difference value corresponding to the time-correction time point of this server network time correction, as historical time correction data, comprises:
    obtaining a plurality of sets of time correction information, wherein the time correction information comprises: first time T1 when a to-be-time-corrected network device sends a time correction request to the time correction server, second time T2 when the time correction server receives the time correction request, third time T3 when the time correction server sends time correction data to the to-be-time-corrected network device, and fourth time T4 when the to-be-time-corrected network device receives the time correction data, and the time correction data comprises: time-correction server time obtained by the time correction server after analyzing the time correction request;
    obtaining a time-correction time point of a server network time correction corresponding to the second time T2 or the third time T3 in each of the sets of time correction information;
    determining a time-correction difference value corresponding to a time-correction time point of each of the server network time corrections, according to each of the sets of time correction information; and
    storing the time-correction time point of each of the server network time corrections and the time-correction difference value corresponding to the time-correction time point of this server network time correction as historical time correction data.

5. The method of claim 4, wherein, determining a time-correction difference value corresponding to a time-correction time point of each of the server network time corrections, according to each of the sets of time correction information, comprises:

calculating a first difference value between the second time T2 and the first time T1 in each of the sets of time correction information, and a second difference value between the fourth time T4 and the third time T3 in each of the sets of time correction information; and dividing a difference between the first difference value and the second difference value by 2, to obtain the time-correction difference value corresponding to the time-correction time point of each of the server network time corrections.

6. The method of claim 1, wherein, calculating a total historical time-correction difference value corresponding to each of the historical time-correction time points, comprises:

obtaining a self-adaptive time-correction flag and determining whether a self-adaptive time correction has been performed according to the self-adaptive time-correction flag;

if the self-adaptive time correction has not been performed, calculating the sum of the time-correction difference value for each of the historical time-correction time points and the time-correction difference values for all historical time-correction time points before this historical time-correction time point, to obtain the total historical time-correction difference value corresponding to this historical time-correction time point; and if the self-adaptive time correction has been performed, adding the sum of the time-correction difference value for each of the historical time-correction time points and the time-correction difference values for all historical time-correction time points before this historical time-correction time point with a time-correction difference value for the self-adaptive time correction that has been performed, to obtain the total historical time-correction difference value corresponding to this historical time-correction time point.

7. The method of claim 1, wherein, obtaining a total current time-correction difference value for the current moment by a preset algorithm, according to the total historical time-correction difference value corresponding to each of the historical time-correction time points, comprises:

determining an average time-correction time point of all the historical time-correction time points;

determining an average total time-correction difference value for all the historical time-correction time points, according to the total historical time-correction difference value corresponding to each of the historical time-correction time points;

obtaining a first parameter by a first calculation formula, according to each of the historical time-correction time points, the total historical time-correction difference value corresponding to each of the historical time-correction time points, the average time-correction time point and the average total time-correction difference value, wherein the first calculation formula is:

$$b = \frac{\sum_{i=1}^{n}(x_i y_i - n\overline{x}\overline{y})}{\sum_{i=1}^{n} x_i^2 - n\overline{x}^2},$$

where, b is the first parameter, $x_i$ is the i-th historical time-correction time point, $y_i$ is a time-correction difference value for the i-th historical time-correction time point, n is the total number of the historical time-correction time points, $\overline{x}$ is the average time-correction time point, $\overline{y}$ is the average total time-correction difference value;

obtaining a second parameter by a second calculation formula, according to the average time-correction time point, the average total time-correction difference value and the first parameter, wherein the second calculation formula is:

$$a = \overline{y} - b\overline{x},$$

where, a is the second parameter, $\overline{y}$ is the average total time-correction difference value, b is the first parameter, $\overline{x}$ is the average time-correction time point;

obtaining a total current time-correction difference value y for the current moment by substituting the first parameter and the second parameter into the following linear fitting equation:

$$y = bx + a$$

wherein, y is the total current time-correction difference value for the current moment, b is the first parameter, x is the time-correction time point of the current moment, and a is the second parameter.

8. The method of claim 1, wherein, adjusting time at the current moment according to the time-correction difference value for the current moment to complete a self-adaptive time correction, comprises:

adding the current moment to the time-correction difference value for the current moment to obtain a target time-correction time for the current moment; and adjusting the time at the current moment to the target time-correction time to complete the self-adaptive time correction.

9. A non-transitory storage medium for storing an executable code which, when executed, performs the network time correction method of claim 1.

10. A network device, comprising: a processor, a memory, a communication interface, and a bus, wherein, the processor, the memory, and the communication interface communicate with each other via the bus;

the memory stores executable program code;

the processor executes a program corresponding to the executable application code by reading the executable application code stored in the memory, to perform the network time correction method of claim 1.

11. A network time correction apparatus, comprising:

an obtaining module, configured for obtaining historical time correction data before a current moment when a self-adaptive time-correction instruction is received, wherein the historical time correction data comprises: each of historical time-correction time points, and a time-correction difference value corresponding to each of the historical time-correction time points;

a calculating module, configured for calculating a total historical time-correction difference value corresponding to each of the historical time-correction time points;

a first determining module, configured for obtaining a total current time-correction difference value for the current moment by a preset algorithm, according to the total historical time-correction difference value corresponding to each of the historical time-correction time points;

a second determining module, configured for determining a difference value between the total current time-correction difference value for the current moment and a total historical time-correction difference value for a historical time-correction time point closest to the current moment, as a time-correction difference value for the current moment; and an adjusting module, configured for adjusting time at the current moment according to the time-correction difference value for the current moment to complete a self-adaptive time correction.

12. The apparatus of claim 11, wherein, the self-adaptive time-correction instruction is generated based on a user input, or is generated periodically according to a preset self-adaptive time-correction period.

13. The apparatus of claim 11, further comprising:

a first storing module, configured for, before the first self-adaptive time-correction instruction is received, performing server network time corrections by a time correction server according to a preset first network time-correction period, and storing a time-correction time point of each of the server network time corrections and a time-correction difference value corresponding to the time-correction time point of this server network time correction, as historical time correction data;

a third determining module, configured for, after the first self-adaptive time-correction instruction is received, prolonging the preset first network time-correction period to a preset duration, and performing a server network time correction by the time correction server according to the preset duration to obtain a first time-correction time point corresponding to this server network time correction and a time-correction difference value corresponding to the first time-correction time point;

a second storing module, configured for, if the number of pieces of the historical time correction data is less than a preset number, storing the first time-correction time point and the time-correction difference value corresponding to the first time-correction time point as historical time correction data; and a third storing module, configured for, if the number of pieces of the historical time correction data is equal to the preset number, deleting the earliest historical time-correction time point in the historical time correction data and a time-correction difference value corresponding to the earliest historical time-correction time point, and storing the first time-correction time point and the time-correction difference value corresponding to the first time-correction time point as historical time correction data.

14. The apparatus of claim 13, wherein, the first storing module comprises:

a first obtaining sub-module, configured for obtaining a plurality of sets of time correction information, wherein the time correction information comprises: first time T1 when a to-be-time-corrected network device sends a time correction request to the time correction server, second time T2 when the time correction server receives the time correction request, third time T3 when the time correction server sends time correction data to the to-be-time-corrected network device, and fourth time T4 when the to-be-time-corrected network device receives the time correction data, and the time correction data comprises: time-correction server time obtained by the time correction server after analyzing the time correction request;

a second obtaining sub-module, configured for obtaining a time-correction time point of a server network time correction corresponding to the second time T2 or the third time T3 in each of the sets of time correction information;

a first determining sub-module, configured for determining a time-correction difference value corresponding to a time-correction time point of each of the server network time corrections, according to each of the sets of time correction information; and a storing sub-module, configured for storing the time-correction time point of each of the server network time corrections and the time-correction difference value corresponding to the time-correction time point of this server network time correction as historical time correction data.

15. The apparatus of claim 14, wherein, the first determining sub-module comprises:

a calculating unit, configured for calculating a first difference value between the second time T2 and the first time T1 in each of the sets of time correction information, and a second difference value between the fourth time T4 and the third time T3 in each of the sets of time correction information;

a determining unit, configured for dividing a difference between the first difference value and the second difference value by 2, to obtain the time-correction difference value corresponding to the time-correction time point of each of the server network time corrections.

16. The apparatus of claim 11, wherein, the calculating module comprises:

a judging sub-module, configured for obtaining a self-adaptive time-correction flag and determining whether a self-adaptive time correction has been performed according to the self-adaptive time-correction flag;

a second determining sub-module, configured for, if the self-adaptive time correction has not been performed, calculating the sum of the time-correction difference value for each of the historical time-correction time points and the time-correction difference values for all historical time-correction time points before this historical time-correction time point, to obtain the total historical time-correction difference value corresponding to this historical time-correction time point; and a third determining sub-module, configured for, if the self-adaptive time correction has been performed, adding the sum of the time-correction difference value for each of the historical time-correction time points and the time-correction difference values for all historical time-correction time points before this historical time-correction time point with a time-correction difference value for the self-adaptive time correction that has been performed, to obtain the total historical time-correction difference value corresponding to this historical time-correction time point.

17. The apparatus of claim 9, wherein, the first determining module comprises:

an average time-correction time point determining sub-module, configured for determining an average time-correction time point of all the historical time-correction time points;

an average total time-correction difference value determining sub-module, configured for determining an average total time-correction difference value for all the historical time-correction time points, according to the total historical time-correction difference value corresponding to each of the historical time-correction time points;

a first parameter determining sub-module, configured for obtaining a first parameter by a first calculation formula, according to each of the historical time-correction time points, the total historical time-correction difference value corresponding to each of the historical time-correction time points, the average time-correction time point and the average total time-correction difference value, wherein the first calculation formula is:

$$b = \frac{\sum_{i=1}^{n}(x_i y_i - n\overline{xy})}{\sum_{i=1}^{n} x_i^2 - n\overline{x}^2},$$

where, b is the first parameter, $x_i$ is the i-th historical time-correction time point, $y_i$ is a time-correction difference value for the i-th historical time-correction time point, n is the total number of the historical time-correction time points, $\overline{x}$ is the average time-correction time point, $\overline{y}$ is the average total time-correction difference value;

a second parameter determining sub-module, configured for obtaining a second parameter by a second calculation formula, according to the average time-correction time point, the average total time-correction difference value and the first parameter, wherein the second calculation formula is:

$$a = \overline{y} - b\overline{x},$$

where, a is the second parameter, $\overline{y}$ is the average total time-correction difference value, b is the first parameter, $\overline{x}$ is the average time-correction time point;

a total current time-correction difference value determining sub-module, configured for obtaining a total current time-correction difference value y for the current moment by substituting the first parameter and the second parameter into the following linear fitting equation:

$$y = bx + a,$$

wherein, y is the total current time-correction difference value for the current moment, b is the first parameter, x is the time-correction time point of the current moment, and a is the second parameter.

18. The apparatus of claim 11, wherein, the adjusting module comprises:
a target time-correction time determining sub-module, configured for adding the current moment to the time-correction difference value for the current moment to obtain a target time-correction time for the current moment; and
an adjusting sub-module, configured for adjusting the time at the current moment to the target time-correction time to complete the self-adaptive time correction.

* * * * *

UNITED STATES PATENT AND TRADEMARK OFFICE
CERTIFICATE OF CORRECTION

PATENT NO. : 10,708,033 B2
APPLICATION NO. : 16/494906
DATED : July 7, 2020
INVENTOR(S) : Sen Xu Page 1 of 1

It is certified that error appears in the above-identified patent and that said Letters Patent is hereby corrected as shown below:

In the Claims

Please replace "The apparatus of claim 9," with -- The apparatus of claim 11, -- (Column 30, Line 55).

Signed and Sealed this
Thirteenth Day of October, 2020

Andrei Iancu
*Director of the United States Patent and Trademark Office*